(12) United States Patent
Shim et al.

(10) Patent No.: US 10,393,949 B2
(45) Date of Patent: Aug. 27, 2019

(54) LIGHT EMITTING MODULE AND DISPLAY DEVICE INCLUDING LIGHT EMITTING MODULE

(71) Applicant: Samsung Display Co., Ltd., Yongin-si, Gyeonggi-do (KR)

(72) Inventors: Kyu-Hun Shim, Seoul (KR); Hyun Su Park, Hwaseong-si (KR); Min Su Jung, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/680,588

(22) Filed: Aug. 18, 2017

(65) Prior Publication Data
US 2018/0059314 A1 Mar. 1, 2018

(30) Foreign Application Priority Data

Aug. 31, 2016 (KR) .......................... 10-2016-0111826

(51) Int. Cl.
*G06F 3/042* (2006.01)
*F21V 8/00* (2006.01)

(52) U.S. Cl.
CPC .......... *G02B 6/0068* (2013.01); *G02B 6/002* (2013.01); *G02B 6/0073* (2013.01); *G02B 6/0091* (2013.01); *G06F 3/0428* (2013.01); *G02B 6/009* (2013.01); *G02B 6/0046* (2013.01); *G02B 6/0076* (2013.01)

(58) Field of Classification Search
USPC ....... 345/175, 102, 690, 501, 174, 176, 173, 345/180, 156; 362/606; 349/65
See application file for complete search history.

(56) References Cited

U.S. PATENT DOCUMENTS

| 2006/0022935 A1* | 2/2006 | Sakai | G02B 6/0076 345/102 |
| 2010/0259470 A1* | 10/2010 | Kohtoku | G02B 6/0021 345/102 |
| 2010/0290246 A1 | 11/2010 | Kim et al. | |

(Continued)

FOREIGN PATENT DOCUMENTS

| CN | 103486503 A | 1/2014 |
| KR | 10-2012-0064524 A | 6/2012 |

(Continued)

OTHER PUBLICATIONS

European Search Report, Application No. 17188664.1, dated Jan. 9, 2018, pp. 1-8.

*Primary Examiner* — Thuy N Pardo
(74) *Attorney, Agent, or Firm* — Innovation Counsel LLP

(57) ABSTRACT

A light emitting module includes a light guide, a first light source, and a second light source. The light guide includes a first face, a second face oriented not parallel to the first face, a third face connected between the first face and the second face, and a light-emitting surface larger than each of the first face, the second face, and the third face. The first light source faces the first face. No light source is positioned between the first light source and an edge of the first face. The second light source faces the third face. No light source is positioned between the second light source and an edge of the third face. A distance from the second light source to the edge of the third face is greater than a distance from the first light source to the edge of the first face.

20 Claims, 23 Drawing Sheets

(56) References Cited

U.S. PATENT DOCUMENTS

| | | | | |
|---|---|---|---|---|
| 2011/0025730 | A1* | 2/2011 | Ajichi | G02B 6/008 |
| | | | | 345/690 |
| 2011/0235365 | A1 | 9/2011 | McCollum et al. | |
| 2011/0286238 | A1* | 11/2011 | Kurata | G02B 6/0021 |
| | | | | 362/606 |
| 2011/0292321 | A1* | 12/2011 | Travis | G02B 6/0056 |
| | | | | 349/65 |
| 2012/0105503 | A1* | 5/2012 | Tada | G02B 6/0038 |
| | | | | 345/690 |
| 2013/0044508 | A1 | 2/2013 | Bae et al. | |
| 2013/0279199 | A1 | 10/2013 | Kang et al. | |
| 2014/0022814 | A1* | 1/2014 | Kurata | G02B 6/0016 |
| | | | | 362/606 |
| 2014/0355306 | A1 | 12/2014 | Seo et al. | |
| 2014/0362092 | A1* | 12/2014 | Mi | G02B 6/0068 |
| | | | | 345/501 |
| 2015/0109352 | A1* | 4/2015 | Takasaki | G09G 3/3406 |
| | | | | 345/690 |
| 2016/0274361 | A1* | 9/2016 | Border | G02B 27/0176 |
| | | | | 345/175 |
| 2017/0067604 | A1* | 3/2017 | Li | G02F 1/1336 |
| | | | | 345/173 |
| 2018/0306965 | A1* | 10/2018 | Fattal | G02B 6/0035 |
| | | | | 345/176 |
| 2019/0025494 | A1* | 1/2019 | Fattal | G02B 6/0036 |
| | | | | 345/180 |

FOREIGN PATENT DOCUMENTS

| | | |
|---|---|---|
| KR | 10-2014-0095259 A | 8/2014 |
| KR | 10-1489672 A | 2/2015 |
| KR | 10-1546741 A | 8/2015 |

\* cited by examiner

LIGHT EMITTING MODULE AND DISPLAY DEVICE INCLUDING LIGHT EMITTING MODULE

CROSS-REFERENCE TO RELATED APPLICATION

This application claims priority to and the benefit of Korean Patent Application No. 10-2016-0111826 filed in the Korean Intellectual Property Office on Aug. 31, 2016; the entire contents of the Korean Patent Application are incorporated herein by reference.

BACKGROUND

(a) Technical Field

The technical field relates to a light emitting module and a display device including a light emitting module.

(b) Description of the Related Art

A display device may include a display panel for displaying an image according to received data. For example, a liquid crystal display may include a liquid crystal panel for displaying an image by controlling an arrangement of liquid crystal molecules to adjust transmittance of light according to received data. The display panel, e.g., the liquid crystal panel, itself may be of a non-emissive type. Therefore, the display device, e.g., the liquid crystal display, may include a light emitting module, e.g., a backlight unit, for providing light to the display panel.

The backlight unit may include one or more of a light guide, a light source unit, a bottom chassis, a reflective sheet disposed in the bottom chassis to reflect light transmitted from the light guide toward the display panel, and a casing in which the light source unit is mounted.

A dark region may be formed in the light guide depending on a position at which the light source is disposed.

The above information disclosed in this Background section is for enhancement of understanding of the background of the application. The Background section may contain information that does not form the prior art that is already known in this country to a person of ordinary skill in the art.

SUMMARY

Embodiments may be related to a light emitting module and a display device having advantages of uniform light luminance distribution.

An embodiment may be related to a light emitting module that includes the following elements: a light guide including a pair of light-emitting surfaces overlapping each other, a first surface formed in parallel with a first direction to connect the light-emitting surfaces, a second surface formed in parallel with a second direction that is different from the first direction to connect the light-emitting surfaces, a third surface formed to connect the first surface with the second surface, and a boundary formed at a portion of the light guide at which the first surface and the third surface are connected with each other; and a light source unit configured to include a first light source disposed at the first surface, a second light source disposed at the third surface, and a substrate in which the first light source and the second light source are mounted, wherein a distance from a center of a light-emitting surface of the second light source to the boundary is greater than a distance from a center of a light-emitting surface of the first light source to the boundary.

The first light source may include a plurality of first light sources, the second light source may include a plurality of second light sources, and a distance between a center of one of the second light sources that is disposed nearest to the boundary and the boundary may be greater than a distance between a center of one of the first light sources that is disposed nearest to the boundary and the boundary.

A distance between the second light sources may be greater than a distance between the first light sources.

The third surface may include a plurality of faces.

The third surface may include a first face set parallel to the first direction, and at least one second light source may be positioned on the first face.

The first face set may include a plurality of first faces, and at least one second light source may be disposed on each of the first faces.

The third surface may further include a second face set parallel to the second direction, and at least one second light source may be positioned on the first face.

The second face set may include a plurality of second faces, and at least one second light source may be disposed on each of the second faces.

The third surface may include a first face and a second face, the first face may be parallel to the first direction and a third direction that is different from the second direction, and the second face may be parallel to the first direction, the second direction, and a fourth direction that is different from the third direction.

The third surface may include at least one curved surface.

The substrate may include: a first substrate surface parallel to the first direction; a second substrate surface parallel to the second direction; and a third substrate surface configured to connect the first substrate surface with the second substrate surface.

The third substrate surface may be planar or curved.

The light-emitting surface of the first light source and the light-emitting surface of the second light source may be perpendicular to a mounting surface of the substrate in which the first light source and the second light source are mounted.

The light-emitting surface of the first light source and the light-emitting surface of the second light source may be parallel to a mounting surface of the substrate in which the first light source and the second light source are mounted.

The first surface may include a pair of first surfaces formed to face each other in the first direction.

A width of a first one of the pair of first surfaces according to the first direction and a direction perpendicular to the second direction may be thicker than that of a second one of the pair of first surfaces according to the first direction and a direction perpendicular to the second direction.

The pair of first surfaces may be symmetrical to each other.

An embodiment may be related to a display device that includes the following elements: a display panel; and a light emitting module disposed in a first surface of the display panel, wherein the light emitting module includes: a light guide including a pair of light-emitting surfaces overlapping each other, a first surface formed in parallel with a first direction to connect the light-emitting surfaces, a second surface formed in parallel with a second direction that is different from the first direction to connect the light-emitting surfaces, a third surface formed to connect the first surface with the second surface, and a boundary formed at a portion of the light guide at which the first surface and the third surface are connected with each other; and a light source unit configured to include a first light source disposed at the first surface, a second light source disposed at the third surface, and a substrate in which the first light source and the second light source are mounted, wherein a distance from a center of a light-emitting surface of the second light source to the boundary is greater than a distance from a center of a light-emitting surface of the first light source to the boundary.

The display device may further include a touch portion disposed on a second surface of the display panel which faces the first surface, to include a plurality of infrared sensors, wherein the touch portion may include a first area formed to correspond to the first surface, a second area formed to correspond to the third surface, and a boundary area which serves as a boundary between the first area and the second area, and wherein a distance from a center of an infrared light-emitting surface of a second infrared sensor disposed in the second area to the boundary area may be greater than a distance from a center of an infrared light-emitting surface of a first infrared sensor disposed in the first area to the boundary area.

The first infrared sensor may include a plurality of first infrared sensors and the second infrared sensor includes a plurality of second infrared sensors, and a distance between a center of an infrared light-emitting surface of one of the second infrared sensors that may be nearest to the boundary area and the boundary area is greater than a distance between a center of an infrared light-emitting surface of one of the first infrared sensors that is nearest to the boundary area and the boundary area.

An embodiment may be related to a light emitting module. The light emitting module may include a light guide, a first light source set, and a second light source set. The light guide may include a light-emitting surface, an opposite surface, a first face, a second face, and a third face. The opposite surface may be opposite the light-emitting surface. Each of the first face, the second face, and the third face may be connected between the light-emitting surface and the opposite surface, may abut each of the light-emitting surface and the opposite surface, may be oriented not parallel to each of the light-emitting surface and the opposite surface, and may be smaller than each of the light-emitting surface and the opposite surface. The second face may be oriented not parallel to the first face and may be connected through the third face to the first face. The first light source set may face (and may directly contact) the first face for emitting first light toward the first face and may include a first first-set light source. No light source may be positioned between the first first-set light source and an edge of the first face. The second light source set may face (and may directly contact) the third face for emitting second light toward the third face and may include a first second-set light source. No light source may be positioned between the first second-set light source and an edge of the third face. A distance from a center of a light-emitting face of the first second-set light source to the edge of the third face may be greater than a distance from a center of a light-emitting face of the first first-set light source to the edge of the first face.

A tangent to the third face may be oriented at an obtuse angle or a right angle with respect to the first face.

The third face may be oriented at an obtuse angle with respect to the first face.

The third face may be oriented at a right angle with respect to the first face.

The third face may be oriented parallel to the first face.

The third face may be a curved face.

The edge of the first face coincides with the edge of the third face.

The first light source set may include a second first-set light source. No light source may be positioned between the first first-set light source and the second first-set light source. The second light source set may include a second second-set light source. No light source may be positioned between the first second-set light source and the second second-set light source. A distance between (a center of) the first second-set light source and (a center of) the second second-set light source may be greater than a distance between (a center of) the first first-set light source and (a center of) the second first-set light source.

The light guide may include a fourth face. Each of the second face and the third face may be connected through the fourth face to the first face.

The third face may be oriented parallel to the first face.

The light emitting module may include a third light source set, which may face the fourth face for emitting third light toward the fourth face and may include a first third-set light source.

The first light source set may include a second first-set light source. No light source may be positioned between the first first-set light source and the second first-set light source. A distance between the first third-set light source and the first second-set light source in a direction parallel to the first face may be greater than a distance between the first first-set light source and the second first-set light source in the direction parallel to the first face.

The fourth face may be oriented at an obtuse angle with respect to at least one of the first face and the third face.

The fourth face may be oriented parallel to the second face.

The light emitting module may include a substrate, which may include a curved substrate section that supports the second light source set.

A total quantity of light sources of the first light source set may be greater than a total quantity of light sources of the second light source set.

The first face may be longer than the third face.

The light guide may include a fourth face, which may face the first face, may be oriented parallel to the first face, and may be shorter than the first face in a direction perpendicular to the light-emitting surface.

The opposite surface may be oriented at an acute angle with respect to the light-emitting surface.

The light guide may include a fourth face, which may be connected between the first face and the second face and may be connected between the light-emitting surface and the opposite surface. No light source may directly contact the fourth face.

An embodiment may be related to a display device. The display device may include a display panel, a light guide, a first light source set, and a second light source set. The light guide may overlap the display panel and may include a first face, a second face oriented not parallel to the first face, a third face shorter than the first face and connected between the first face and the second face, and a light-emitting surface larger than each of the first face, the second face, and the third face. The first light source set may be disposed at the first face. The second light source may be disposed at the third face. A distance between two closest light sources of the second light source set may be greater than a distance between two closest light sources of the first light source.

The display device may include a touch portion, a first infrared sensor set, and a second infrared sensor set. The touch portion may include a first area corresponding to the first surface and may include a second area corresponding to the third surface. The first infrared sensor set may be disposed at the first area and may include a first first-set infrared sensor. No infrared sensor may be positioned between the first first-set infrared sensor and an edge of the first area. The second infrared sensor set may be disposed at the second area and may include a first second-set infrared sensor. No infrared sensor may be positioned between the first second-set infrared sensor and an edge of the second area. A distance from a center of an infrared light-emitting surface of the first second-set infrared sensor to the edge of the second area may be greater than a distance from a center of an infrared light-emitting surface of the first first-set infrared sensor to the edge of the first area.

A distance between two closet infrared sensors of the second infrared sensor set may be greater than a distance between two closest infrared sensors of the first infrared sensor set.

According to embodiments, a light emitting module and a display device may have substantially uniform light luminance distribution.

DETAILED DESCRIPTION OF EMBODIMENTS

Figure 1:
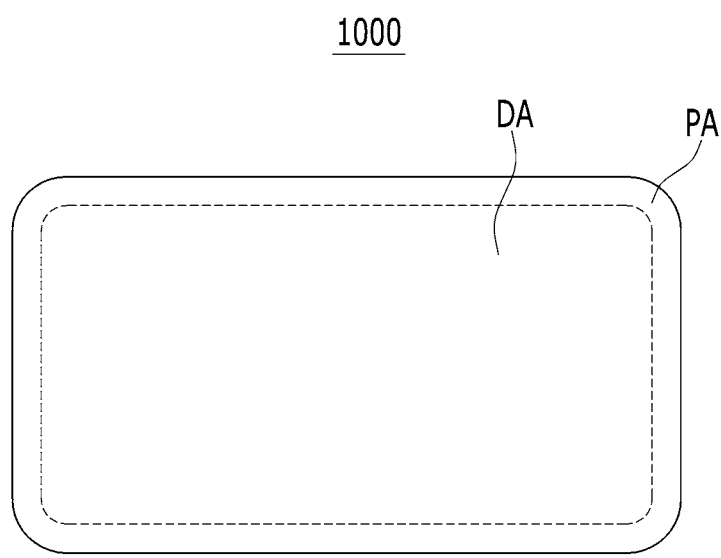
FIG. 1 is a top plan view schematically illustrating a display device according to an embodiment.

Example embodiments are described with reference to the accompanying drawings.

In the description, like reference numerals may designate like elements. The size and thickness of each component shown in the drawings may be illustrated for better understanding and ease of description, without limiting embodiments.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

It will be understood that when a first element is referred to as being "on" a second element, the first element can be directly on the second element, or one or more intervening elements may also be present.

Figure 2:
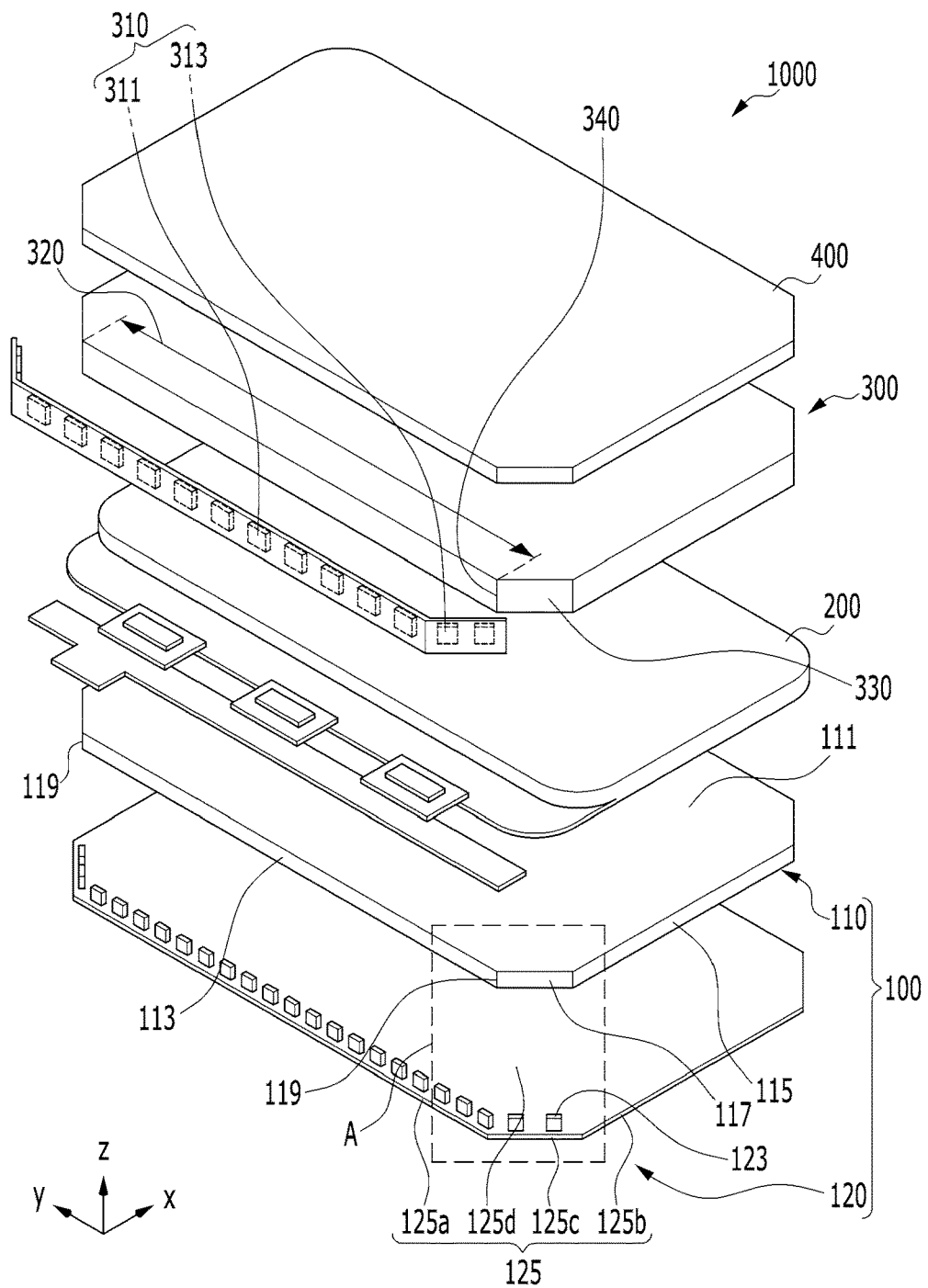
FIG. 2 is an exploded perspective view schematically illustrating a display device according to an embodiment.

FIG. 1 is a top plan view schematically illustrating a display device 1000, and FIG. 2 is an exploded perspective view schematically illustrating the display device 1000 according to an embodiment. The display device 1000 illustrated in FIG. 2 includes a light emitting module 100 including a light source unit 120 in which a light-emitting surface of first light sources 121 (see FIG. 3) and a light-emitting surface of second light sources 123 are substantially perpendicular to a mounting surface 125d of a substrate 125 on which the first light sources 121 and the second light sources 123 are mounted.

Referring to FIG. 1 and FIG. 2, the light emitting module 100 includes a display area DA and a peripheral area PA, and is used for the display device 1000 having a quadrangular shape with rounded corners.

Referring to FIG. 2, the light emitting module 100 is disposed in a surface of a display panel 200 to supply light to the display panel 200, and includes a light guide 110 and the light source unit 120. The display panel 200 serves to display a screen by using light supplied from the light emitting module 100.

The light guide 110 serves to substantially uniformly supply light to the display panel 200 by diffusing the light supplied from the light source unit 120 by total reflection, and has a plate-like shape including a pair of light-emitting surfaces 111 or including a light-emitting surface 111 and an opposite surface opposite the light-emitting surface 111. The light-emitting surfaces 111 (or the light-emitting surface 111 and the opposite surface) are connected with each other by/through side faces 113, 115, and 117 including a face 113, a face 115, and a face set 117.

In an embodiment, the face 113 is parallel to a first direction, and the face 115 is parallel to a second direction that is different from the first direction. In FIG. 2, the first direction indicates an x-axis and the second direction indicates a y-axis. Referring to FIG. 2, the face 113 may indicate a side surface formed at a long side of the light guide 110, and the face 115 may indicate a side surface at a short side of the light guide 110.

Figure 3:
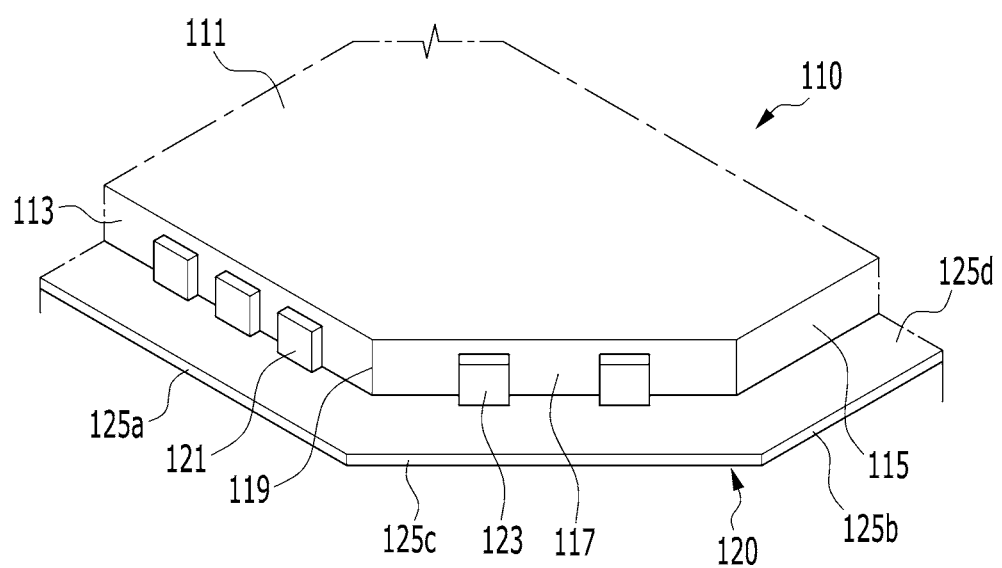
FIG. 3 is a perspective view illustrating a portion of a light emitting module corresponding to an area A of the display device illustrated in FIG. 2 according to an embodiment.
Figure 4:
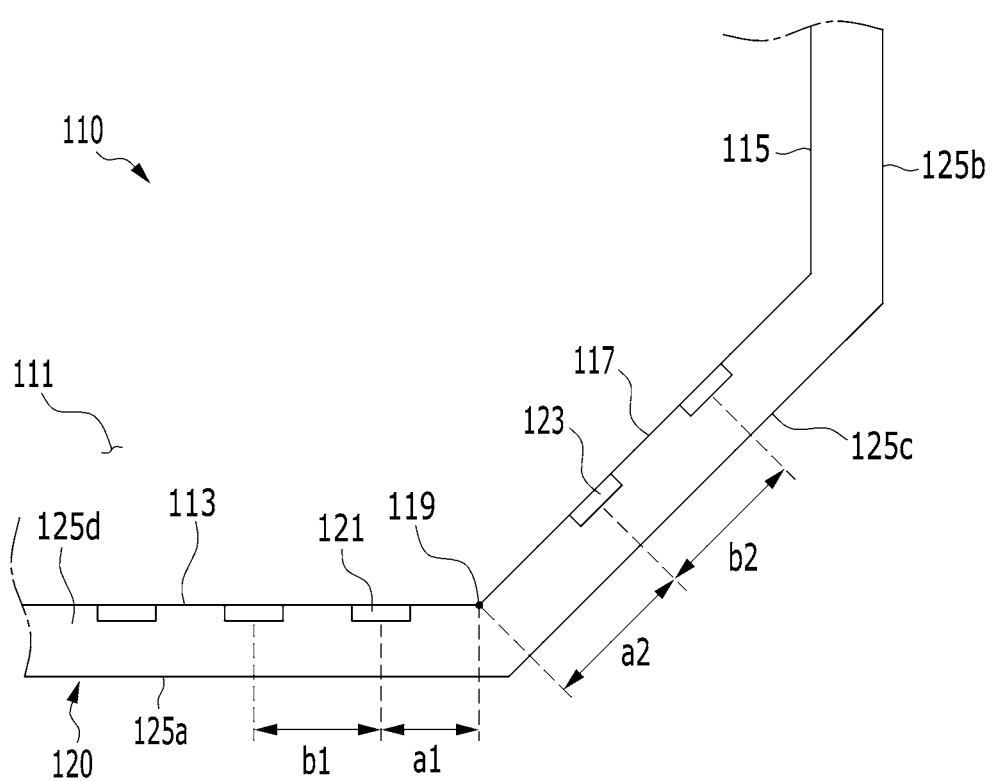
FIG. 4 is a top plan view illustrating the portion of the light emitting module of FIG. 3 according to an embodiment.

In an embodiment, the light emitting module 100 is used for the display device 1000 having the quadrangular shape with the rounded corners, and the light guide 110 included in the light emitting module 100 includes the face set 117 formed at a position corresponding to one or more of the rounded corners of the display device 1000. The face set 117 may have various shapes in various directions, and various examples of the face set 117 will be described. FIG. 3 is an enlarged view illustrating a portion of a light emitting module 100 corresponding to an area A of the display device illustrated in FIG. 2, and FIG. 4 is a top plan view illustrating the light emitting module 100 of FIG. 3.

In FIG. 3, the light guide 110 includes the face set 117 which connects the face 113 to the face 115. In the embodiment of FIG. 3, the face set 117 is parallel to a third direction that is different from the first direction and the second direction.

In an embodiment, the light guide 110 includes a boundary 119 (which may coincide with an edge of the face 113 and/or an edge of the face set 117) formed at a position at which the face 113 is connected with the face set 117. In other words, the face 113 and the face set 117 may be divided from each other by the boundary 119, and the boundary 119 may be defined as an edge formed where the face 113 and the face set 117 are connected with each other, or may be defined as a point where a direction changes while it is extended from the face 113 parallel to the first direction toward the face set 117.

The light source unit 120 includes the plurality of first light sources 121, the plurality of second light sources 123, and the substrate 125 (see FIG. 2). The first light sources 121 are disposed on the face 113 of the light guide 110 to supply light to the face 113, and the second light sources 123 are disposed on the face set 117 of the light guide 110 to supply light to the face set 117. According to an embodiment, the first light sources 121 and the second light sources 123 may be formed of light emitting diodes (LEDs).

The substrate 125 (see FIG. 2) includes the mounting surface 125d on which the first light sources 121 and the second light sources 123 are mounted, and a circuit (not illustrated) for driving the first light sources 121 and the second light sources 123. According to an embodiment, similar to the light guide 110, the substrate 125 (see FIG. 2) includes a first substrate surface 125a parallel to the first direction, a second substrate surface 125b parallel to the second direction, and a third substrate surface 125c which connects the first substrate surface 125a with the second substrate surface 125b.

In an embodiment, the third substrate surface 125c may have a planar or curved shape to correspond to the shape of the face set 117 of the light guide 110, but the shape of the third substrate surface 125c may not correspond to the shape of the face set 117. This will be described later in detail when numerous modifications of the light guide 110 are described.

Referring to FIG. 4, a distance a2 from a center of a light-emitting surface of a second light source 123 disposed in the face set 117 to the boundary 119 between the face 113 and the face set 117 (or the edge of the face 113) is greater than a distance a1 from a center of a light-emitting surface of a first light source 121 disposed in the face 113 to the boundary 119 between the face 113 and the face set 117 (or the edge of the face set 117). In other words, based on the boundary 119, the distance a2 to the center of the light-emitting surface of the second light source 123 disposed in the face set 117 is greater than the distance a1 to the center of the light-emitting surface of the first light source 121 disposed in the face 113.

Figure 5:
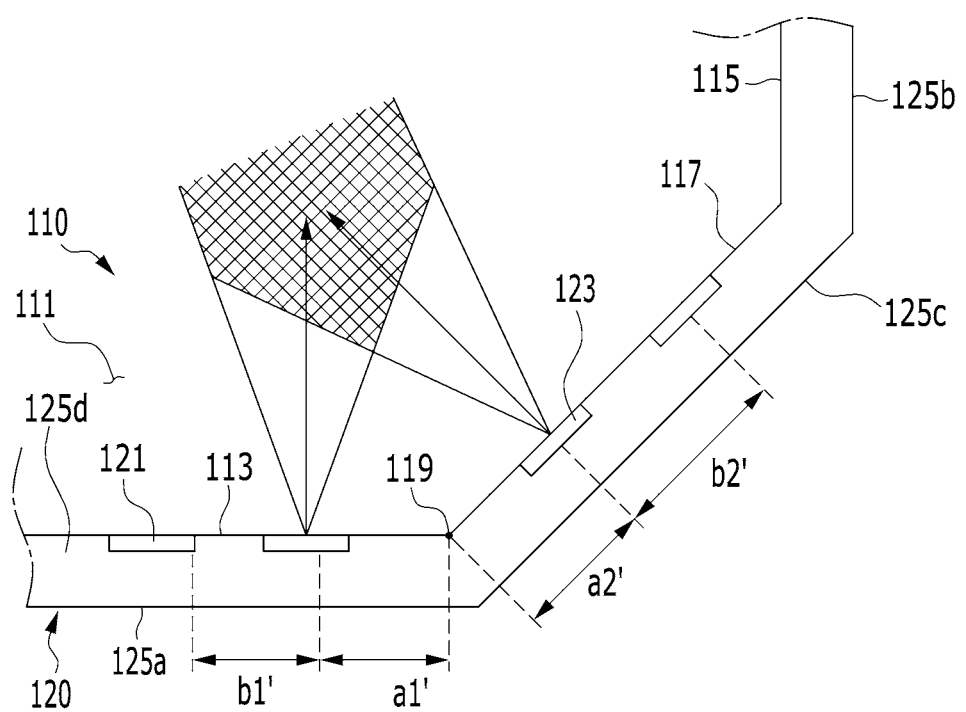
FIG. 5 is a top plan view illustrating a portion of a light emitting module according to an embodiment.
Figure 6:
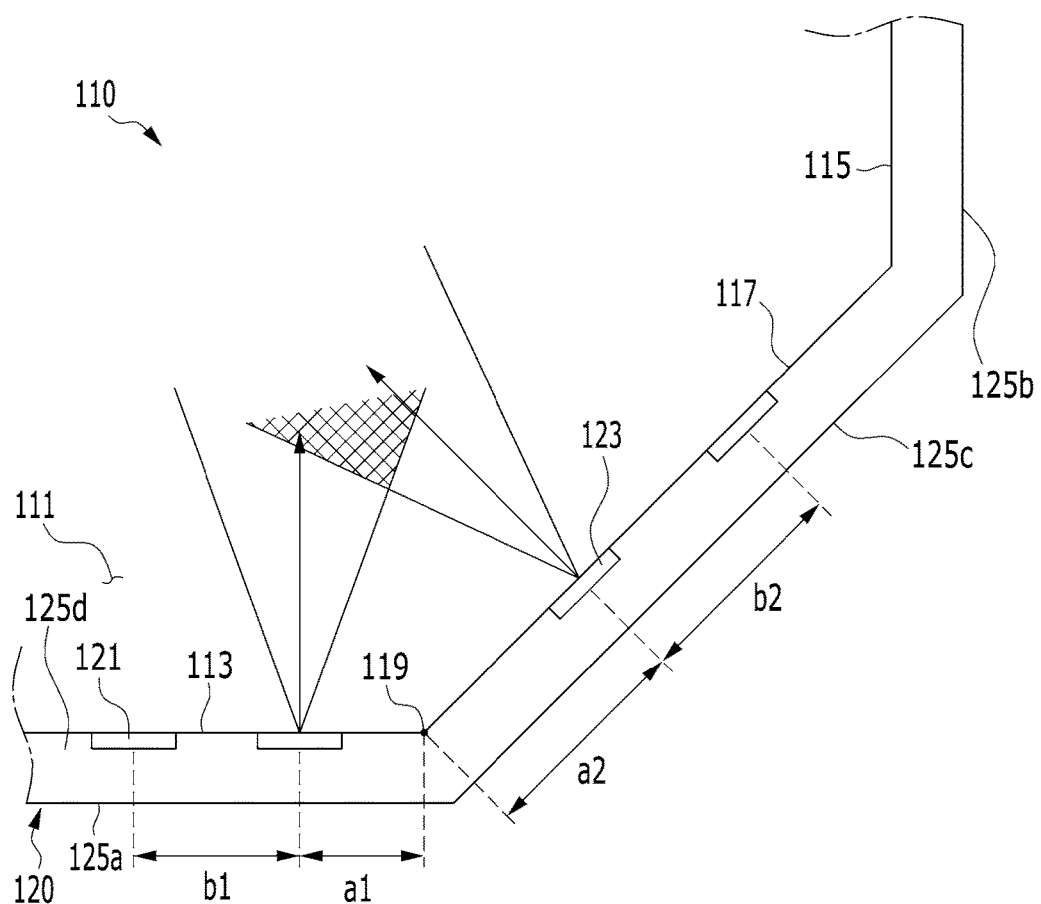
FIG. 6 is a top plan view illustrating a portion of a light emitting module according to an embodiment.

FIG. 5 and FIG. 6 are views for describing a difference depending on a variation of the distances from the boundary 119 to the first light sources 121 and second light sources 123 disposed in the face 113 and the face set 117. FIG. 5 illustrates a first case that a distance a1' from the boundary 119 to the center of the light-emitting surface of the first light sources 121 is equal to a distance a2' from the boundary 119 to the center of the light-emitting surface of the second light sources 123, and FIG. 6 illustrates a second case that the distance a2 from the boundary 119 to the center of the light-emitting surface of the second light sources 123 is greater than the distance a1 from the boundary 119 to the center of the light-emitting surface of the first light sources 121 as in the embodiment of FIG. 3 and FIG. 4.

Referring to FIG. 5 and FIG. 6, in the case of the plurality of first light sources 121 and the plurality of second light sources 123, the distance (a1', a1) between one of the first light sources 121 that is disposed nearest to the boundary 119 and the boundary 119 and the distance (a2', a2) between one of the second light sources 123 that is disposed nearest to the boundary 119 and the boundary 119 are measured for comparison.

When measuring the distance a1 from the boundary 119 to the center of the light-emitting surface of the first light sources 121 and the distance a2 from the boundary 119 to the center of the light-emitting surface of the second light sources 123, reference points of the first light sources 121 and the second light sources 123 are the centers of the light-emitting surfaces thereof.

Accordingly, in the case of FIG. 5, the distance a1' from the center of the light-emitting surface of the first light sources 121 to the boundary 119 is equal to the distance a2' from the center of the light-emitting surface of the second light sources 123 to the boundary 119. In contrast, in the case of FIG. 6, the distance a2 from the center of the light-emitting surface of the second light sources 123 to the boundary 119 is greater than the distance a1 from the center of the light-emitting surface of the first light sources 121 to the boundary 119.

Since the same light sources are used, outputs generated from the light sources of the first light sources 121 and the second light sources 123 are equal to each other. Accordingly, Referring to FIG. 5, light emitted from the first light sources 121 and the second light sources 123 are overlapped in many ranges. Accordingly, when the distance a1' from the center of the light-emitting surface of the first light sources 121 to the boundary 119 is equal to the distance a2' from the center of the light-emitting surface of the second light sources 123 to the boundary 119 Referring to FIG. 5, such light-overlapping ranges are expanded. Thus, it is difficult to adjust light luminance at the rounded corners of the display device 1000.

In contrast, when the distance a2 from the center of the light-emitting surface of the second light sources 123 to the boundary 119 is greater than the distance a1 from the center of the light-emitting surface of the first light sources 121 to the boundary 119 Referring to FIG. 6, an overlapped amount of light emitted from the first light sources 121 and the second light sources 123 is reduced. Thus, it is easy to adjust light luminance at the rounded corners of the display device 1000. Therefore, it is possible to provide the light emitting module 100 having substantially uniform light luminance distribution.

Referring to FIG. 6, as described above, in the case of the plurality of first light sources 121 and the plurality of second light sources 123, a distance b2 between the second light sources 123 may be greater than a distance b1 between the first light sources 121. In an embodiment, the distance b1 between the first light sources 121 indicates a distance between centers of light-emitting surfaces of two first light sources 121 disposed (e.g., closest) adjacent to each other. Similarly, the distance b2 between the second light sources 123 indicates a distance between centers of light-emitting surfaces of two second light sources 123 disposed (e.g., closet) adjacent to each other.

This may be applied to a case that the distance b1 between the first light sources 121 and the distance b2 between the second light sources 123 are constant, but may also be applied to a case that the distance b1 between the first light sources 121 and the distance b2 between the second light sources 123 are not constant.

When the distance b1 between the first light sources 121 and the distance b2 between the second light sources 123 are not constant, a maximum or minimum of the distance b2 between the second light sources 123 may be greater than that of the distance b1 between the first light sources 121.

Referring to FIG. 7 to FIG. 12, the light guide 110 includes a face set 117 including a plurality of faces 118.

Figure 7:
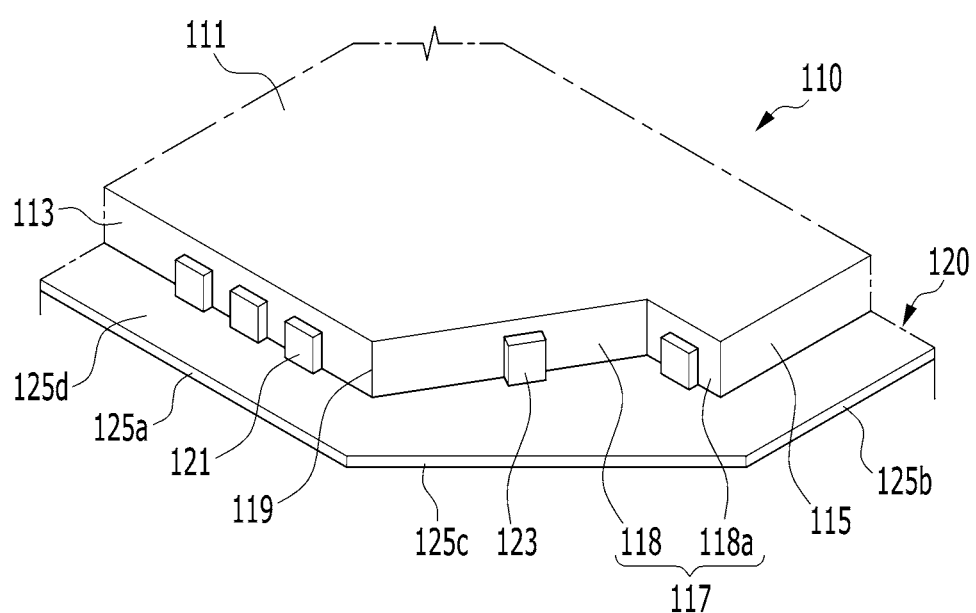
FIG. 7 is a perspective view illustrating a portion of a light emitting module according to an embodiment.
Figure 8:
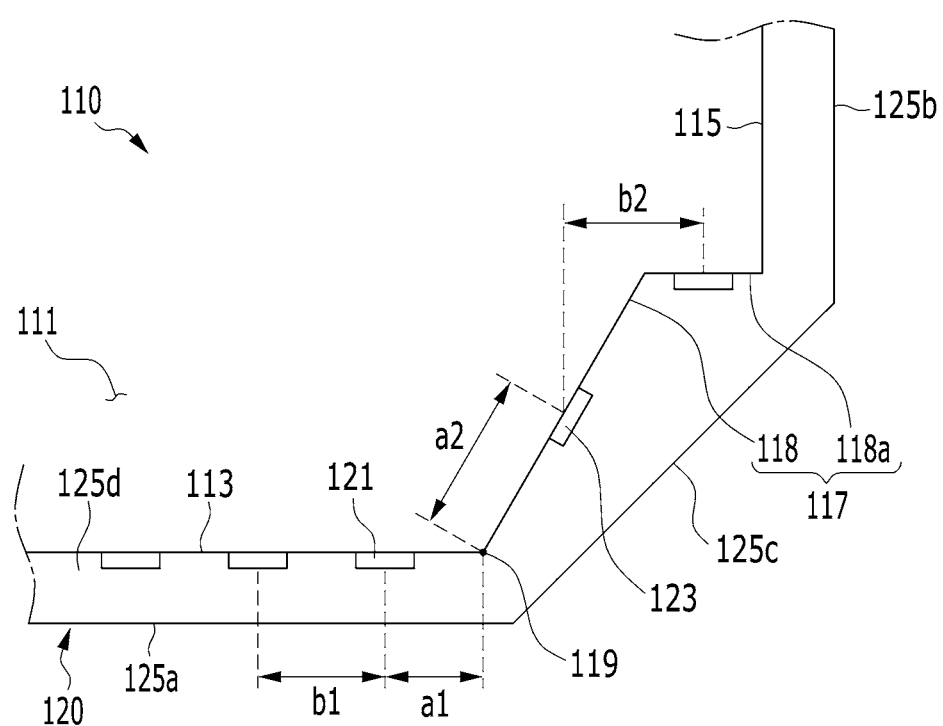
FIG. 8 is a top plan view illustrating a portion of a light emitting module according to an embodiment.

FIG. 7 is an enlarged view illustrating a corner portion of the light emitting module 100 including the light guide 110 according to a first modification of the light guide 110 illustrated in FIG. 3, and FIG. 8 is a top plan view of the light emitting module 100 illustrated in FIG. 7.

Referring to FIG. 7 and FIG. 8, according to an embodiment, the face set 117 of the light guide 110 includes a face 118a parallel to the first direction. In an embodiment, at least one second light source 123 may be disposed in the face 118a. For example, Referring to FIG. 7 and FIG. 8, one second light source 123 may be disposed in/on the face 118a, and one second light source 123 may be disposed in/on a face 118 of the face set 117. In embodiments, a plurality of second light sources 123 may be disposed in/on the face 118a and/or a face 118 of the face set 117, or only one second light source 123 may be disposed in/on the face 118a.

According to the first modification of FIG. 3, in the light guide 110, the distance a2 from the center of the light-emitting surface of the second light sources 123 to the boundary 119 is greater than the distance a1 from the center of the light-emitting surface of the first light sources 121 to the boundary 119. Accordingly, similar to the light guide 110 illustrated in FIG. 3, an overlapped amount of light emitted from the first light sources 121 and the second light sources 123 may be reduced. Thus, it is easy to adjust light luminance.

Further, as in the embodiment of FIG. 3, the distance b2 between the second light sources 123 may be greater than the distance b1 between the first light sources 121. In an embodiment, the distance b1 between the first light sources 121 indicates a distance between (e.g., closest) two first light sources 121 disposed adjacent to each other, according to the first direction. Similarly, the distance b2 between the second light sources 123 indicates a distance between (e.g. closest) two second light sources 123 disposed adjacent to each other, according to the first direction.

Figure 9:
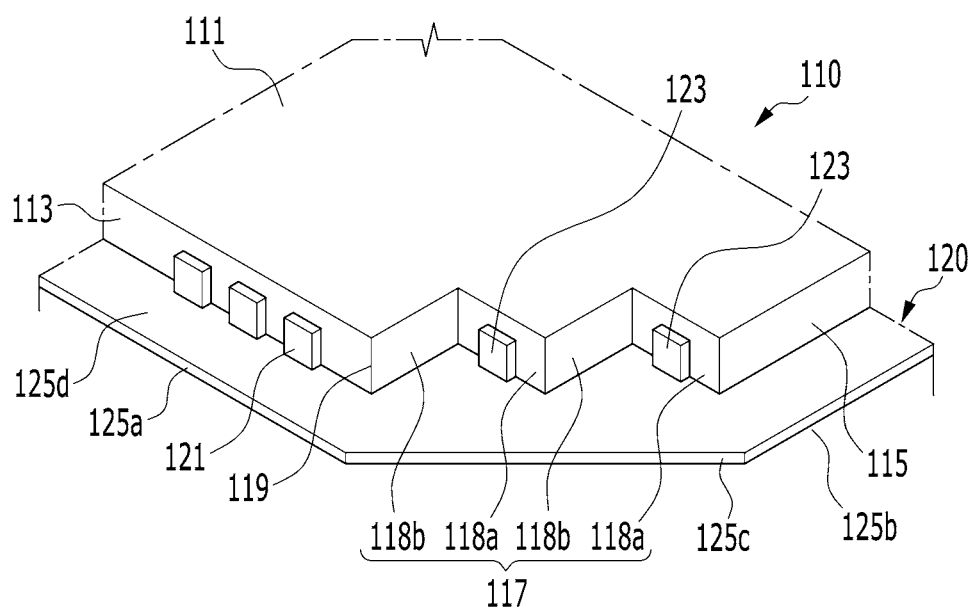
FIG. 9 is a perspective view illustrating a portion of a light emitting module according to an embodiment.
Figure 10:
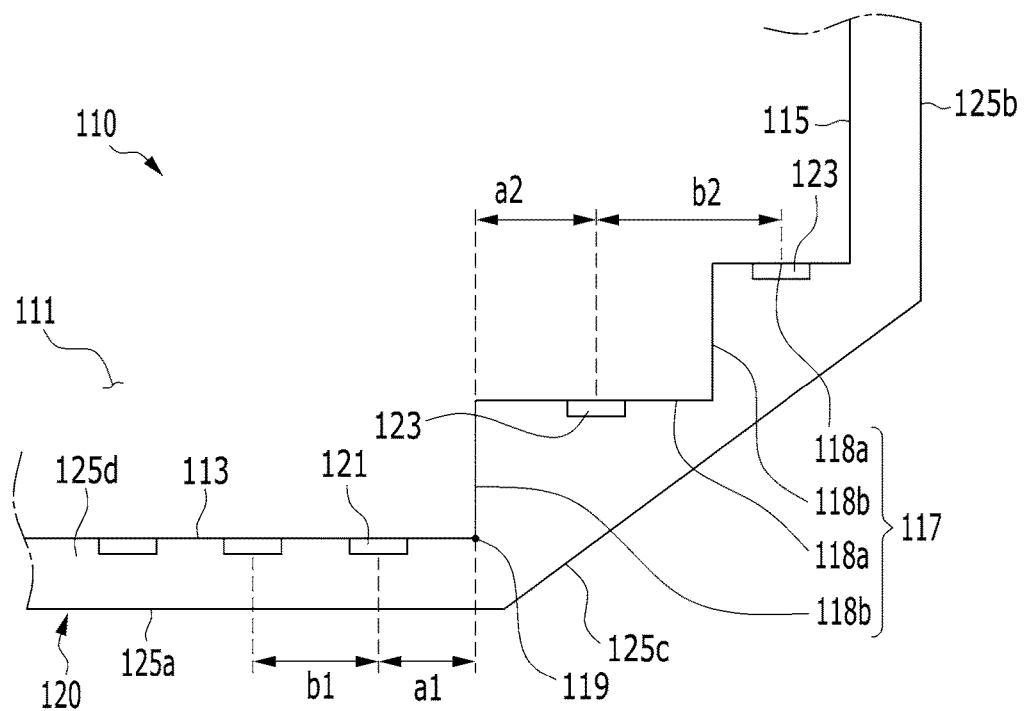
FIG. 10 is a top plan view illustrating a portion of a light emitting module according to an embodiment.

FIG. 9 is an enlarged view illustrating a corner portion of the light emitting module 100 including the light guide 110 according to a second modification of the light guide 110 illustrated in FIG. 3, and FIG. 10 is a top plan view of the light emitting module 100 illustrated in FIG. 9.

Referring to FIG. 9 and FIG. 10, according to the second modification of FIG. 3, the face set 117 of the light guide 110 includes a plurality of faces 118a parallel to the face 113 and/or parallel to the first direction. According to an embodiment, at least one second light source 123 may be disposed in/on each of the faces 118a. FIG. 9 and FIG. 10 illustrate an example in which one second light source 123 is disposed in/on each of the faces 118a.

In an embodiment, the face set 117 may further include a face 118b parallel to the second direction. At least one second light source 123 may be disposed in/on the face 118b. FIG. 9 and FIG. 10 illustrate an example in which the face set 117 includes a plurality of faces 118b. Referring to FIG. 9 and FIG. 10, in an embodiment, at least one second light source 123 may be disposed in each of the faces 118b.

Referring to FIG. 10, in the light guide 110 according to the second modification of FIG. 3, the distance a2 from the center of the light-emitting surface of a second light source 123 to the boundary 119 (or an edge of the face 118b) is greater than the distance a1 from the center of the light-emitting surface of the first light sources 121 to the boundary 119 (or an edge of the face 113). Accordingly, similar to the light guide 110 illustrated in FIG. 3, an overlapped amount of light emitted from the first light sources 121 and the second light sources 123 may be reduced. Thus, it is easy to adjust light luminance.

Further, as in the light guide 110 according to the embodiment of FIG. 3 and the light guide 110 according to the first modification, the distance b2 between (e.g., two closest of) the second light sources 123 may be greater than the distance b1 between (e.g., two closest of) the first light sources 121. In an embodiment, the distance b1 between the first light sources 121 indicates a distance between (e.g., closest) two first light sources 121 disposed adjacent to each other. Similarly, the distance b2 between the second light sources 123 indicates a distance between (e.g., closest) two second light sources 123 disposed adjacent to each other.

Figure 11:
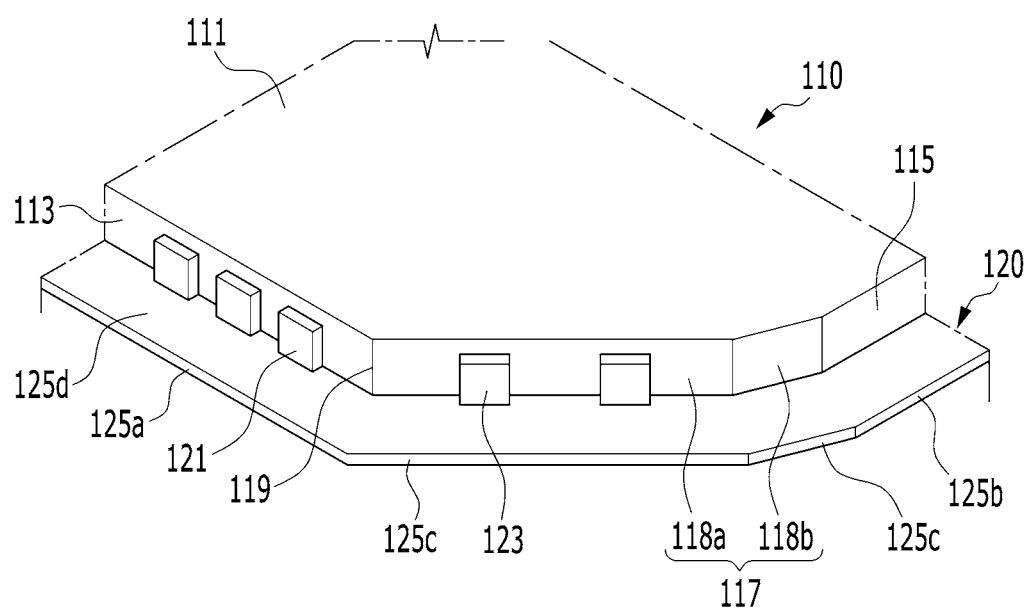
FIG. 11 is a perspective view illustrating a portion of a light emitting module according to an embodiment.
Figure 12:
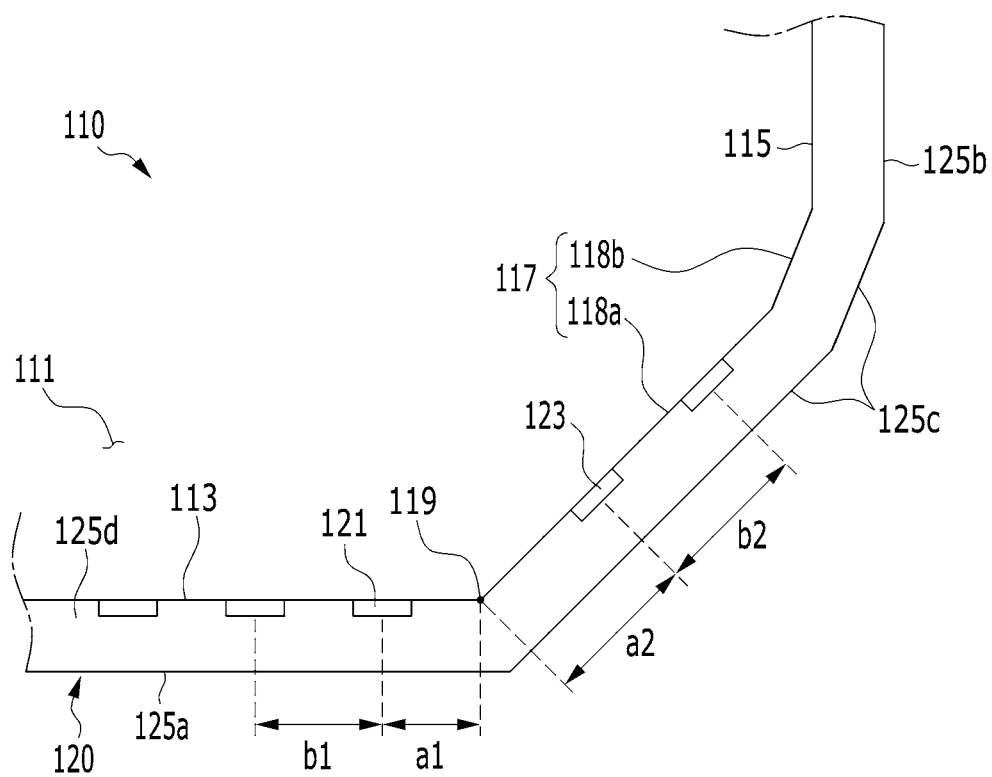
FIG. 12 is a top plan view illustrating a portion of a light emitting module according to an embodiment.

FIG. 11 is an enlarged view illustrating a corner portion of the light emitting module 100 including the light guide 110 according to a third modification of the light guide 110 illustrated in FIG. 3, and FIG. 12 is a top plan view of the light emitting module 100 illustrated in FIG. 11.

Referring to FIG. 11 and FIG. 12, according to the third modification of FIG. 3, the face set 117 of the light guide 110 includes a face 118a and a face 118b. In an embodiment, each of the face 118a and the face 118b is disposed in parallel to a direction that is different from the first direction and the second direction. Specifically, the face 118a is disposed in parallel to a third direction that is different from the first direction and the second direction, and the face 118b is disposed in parallel to a fourth direction that is different from the first direction, the second direction, and the third direction.

FIG. 11 and FIG. 12 illustrate an example in which the second light source 123 is disposed only in/on the face 118a. In an embodiment, at least one second light source 123 may be disposed in/on the face 118a and/or the face 118b.

Referring to FIG. 12, in the light guide 110 according to the third modification of FIG. 3, the distance a2 from the center of the light-emitting surface of an edge second light source 123 to the boundary 119 is greater than the distance a1 from the center of the light-emitting surface of an edge first light source 121 to the boundary 119. Accordingly, similar to the light guide 110 illustrated in FIG. 3, an overlapped amount of light emitted from the first light sources 121 and the second light sources 123 may be reduced. Thus, it is easy to adjust light luminance.

Further, as in the light guide 110 according to the embodiment of FIG. 3 and the light guide 110 according to the first modification and the second modification, the distance b2 between the second light sources 123 may be greater than the distance b1 between the first light sources 121. In an embodiment, the distance b1 between the first light sources 121 indicates a distance between (e.g., closest) two first light sources 121 disposed adjacent to each other. Similarly, the distance b2 between the second light sources 123 indicates a distance between (e.g., closest) two second light sources 123 disposed adjacent to each other.

As described above, according to the first modification to the third modification of FIG. 3, the face set 117 of the light guide 110 may include a plurality of surfaces. In an embodiment, although the face set 117 of the light guide 110 includes the faces, the substrate 125 (see FIG. 2) of the light source unit 120 may include only one third substrate surface 125c which connects the first substrate surface 125a to the second substrate surface 125b. In an embodiment, the third substrate surface 125c may include a plurality of faces which correspond to the faces of the face set 117 of the light guide 110.

Figure 13:
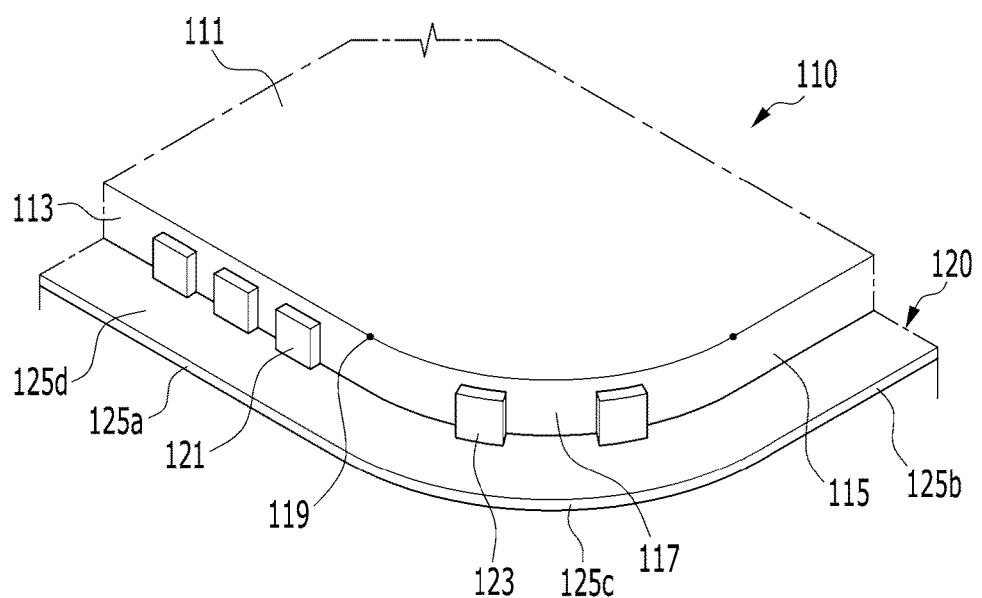
FIG. 13 is a perspective view illustrating a portion of a light emitting module according to an embodiment.
Figure 14:
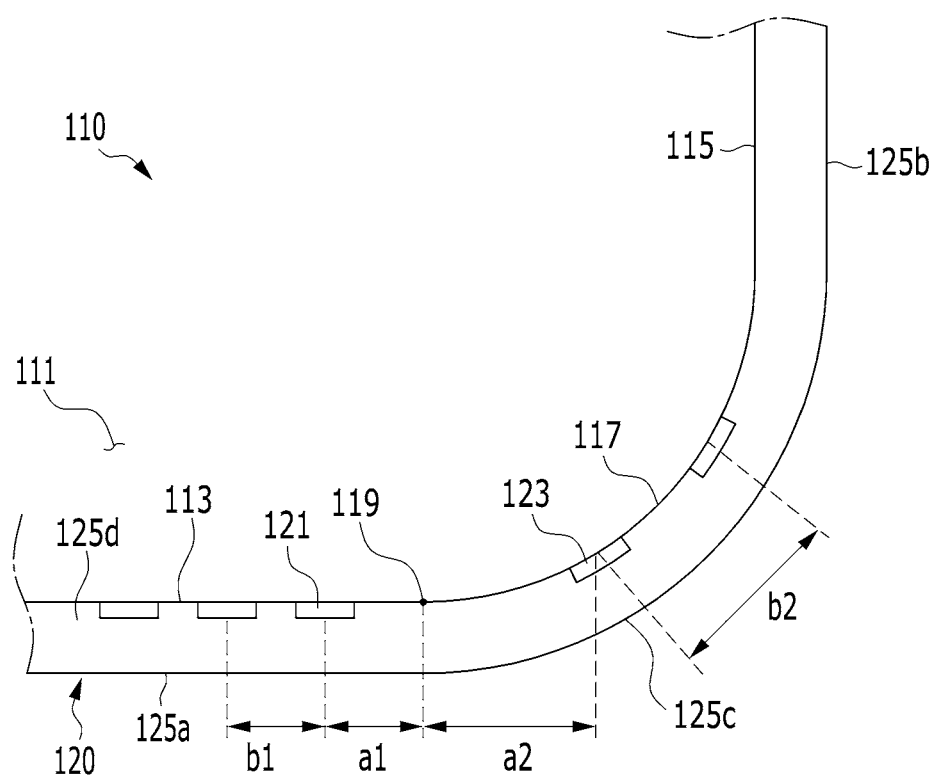
FIG. 14 is a top plan view illustrating a portion of a light emitting module according to an embodiment.

FIG. 13 is an enlarged view illustrating a corner portion of the light emitting module 100 including the light guide 110 according to a fourth modification of the light guide 110 illustrated in FIG. 3, and FIG. 14 is a top plan view of the light emitting module 100 illustrated in FIG. 13.

Referring to FIG. 13 and FIG. 14, according to the fourth modification of FIG. 3, the light guide 110 includes a face set 117 formed as one curved surface. Referring to FIG. 13 and FIG. 14, according to an embodiment, the second light sources 123 disposed in the face set 117 may be disposed along the curved face set 117. A tangent to the curved face set 117 may be oriented at an obtuse angle or a right angle with respect to the face 113.

According to an embodiment, the substrate 125 (see FIG. 125) of the light source module includes a third substrate surface 125c which connects the first substrate surface 125a to the second substrate surface 125b and has at least one curved surface corresponding to the shape of the face set 117 of the light guide 110. In an embodiment, the third substrate surface 125c of the substrate 125 (see FIG. 2) may include substantially flat faces regardless of the curved structure of the face set 117 of the light guide 110.

Referring to FIG. 14, similar to the light guide 110 illustrated in FIG. 3 and the light guide 110 according to the first modification to the third modification, in the light guide 110 according to the fourth modification of FIG. 3, the distance a2 from the center of the light-emitting surface of an edge second light source 123 to the boundary 119 (which may coincide with an edge of the face set 117) is greater than the distance a1 from the center of the light-emitting surface of an edge first light source 121 to the boundary 119 (which may coincide with an edge of the face 113). Accordingly, similar to the light guide 110 illustrated in FIG. 3, an overlapped amount of light emitted from the first light sources 121 and the second light sources 123 may be reduced. Thus, it is easy to adjust light luminance.

Further, as in the light guide 110 according to the embodiment of FIG. 3 and the light guide 110 according to the first modification to the third modification, the distance b2 between the second light sources 123 may be greater than the distance b1 between the first light sources 121. In an embodiment, the distance b1 between the first light sources 121 indicates a distance between (e.g., closest) two first light sources 121 disposed adjacent to each other in the first direction. Similarly, the distance b2 between the second light sources 123 indicates a distance between (e.g., closest) two second light sources 123 disposed adjacent to each other in the first direction.

FIG. 13 and FIG. 14 illustrate an example in which the face set 117 of the light guide 110 connects the face 113 to the face 115 and includes only one curved ace. According to an embodiment, the face set 117 may include a plurality of curved faces having different curvature radii or curvatures.

In the first modification to the fourth modification of FIG. 3 illustrated in FIG. 7 to FIG. 14, the light emitting module 100 including the light source unit 120 in which the light-emitting surfaces of the first light sources 121 and the second light sources 123 are perpendicular to the mounting surface 125d of the substrate 125 in which the first light sources 121 and the second light sources 123 are mounted. This is referred to as a side-view type of light source unit 120.

Figure 15:
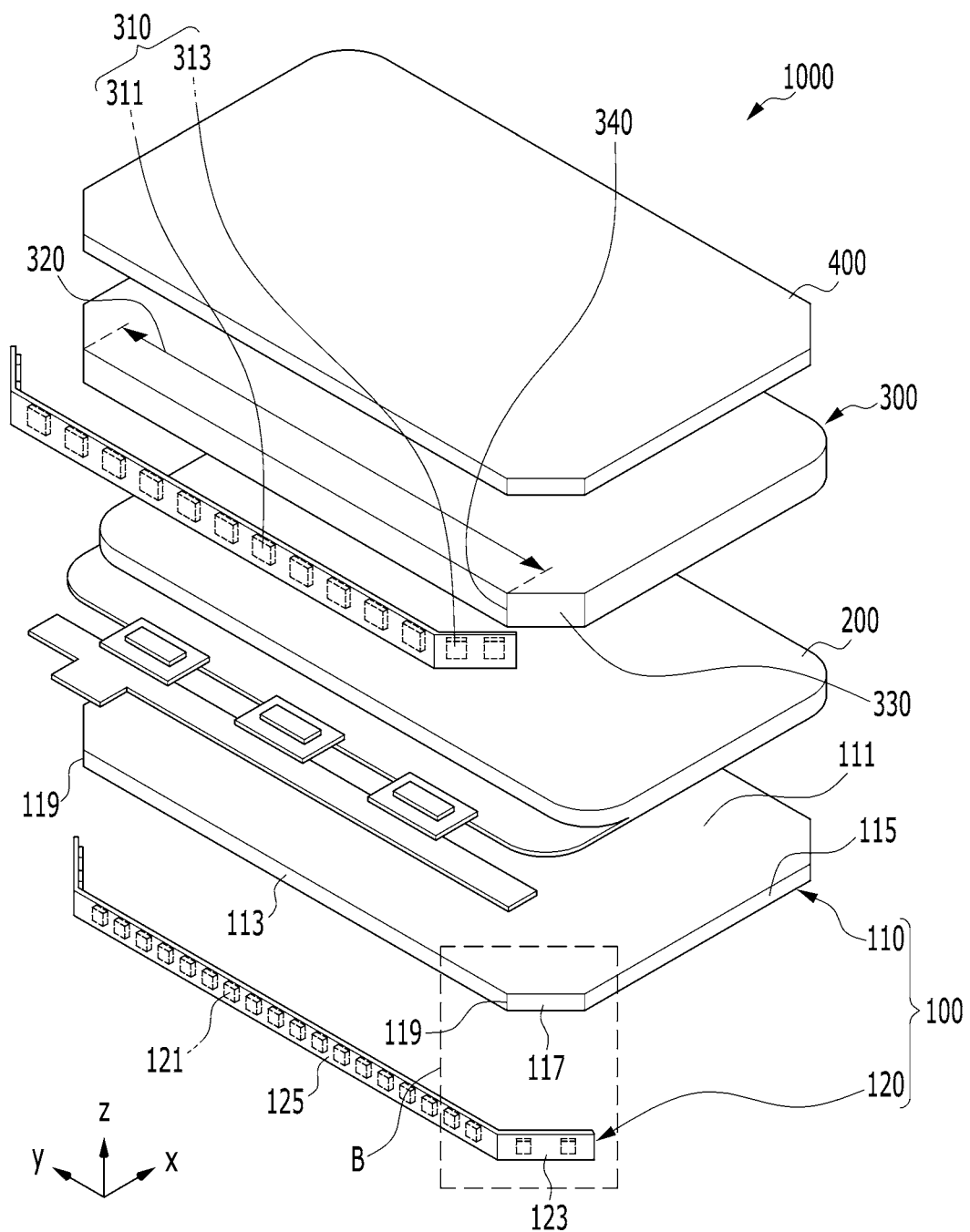
FIG. 15 is an exploded perspective view illustrating a display device according to an embodiment.
Figure 16:
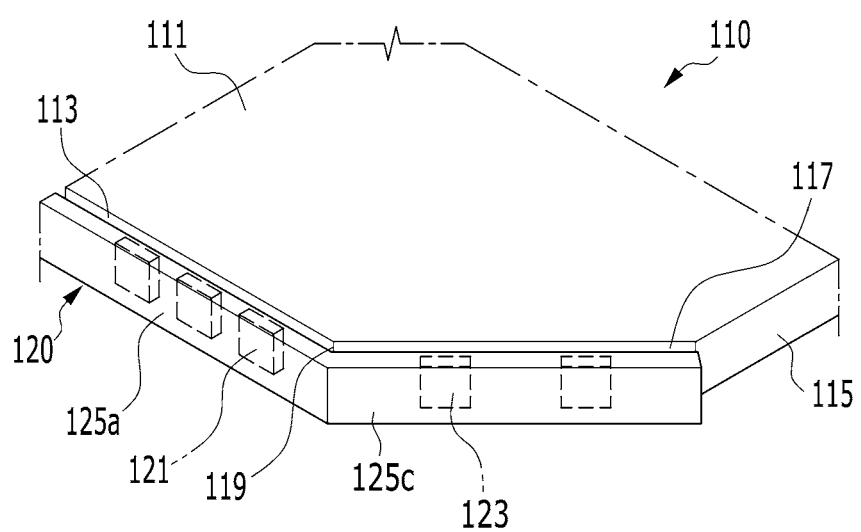
FIG. 16 is a perspective view illustrating a portion of a light emitting module corresponding to an area B of the display device illustrated in FIG. 15 according to an embodiment.

In an embodiment, FIG. 15 and FIG. 16 illustrate the light emitting module 100 including the light source unit 120 in which the light-emitting surfaces of the first light sources 121 and the second light sources 123 are parallel to the mounting surface of the substrate 125 in which the first light sources 121 and the second light sources 123 are mounted according to an embodiment. This is referred to as a top-view type of light source unit 120.

Figure 17:
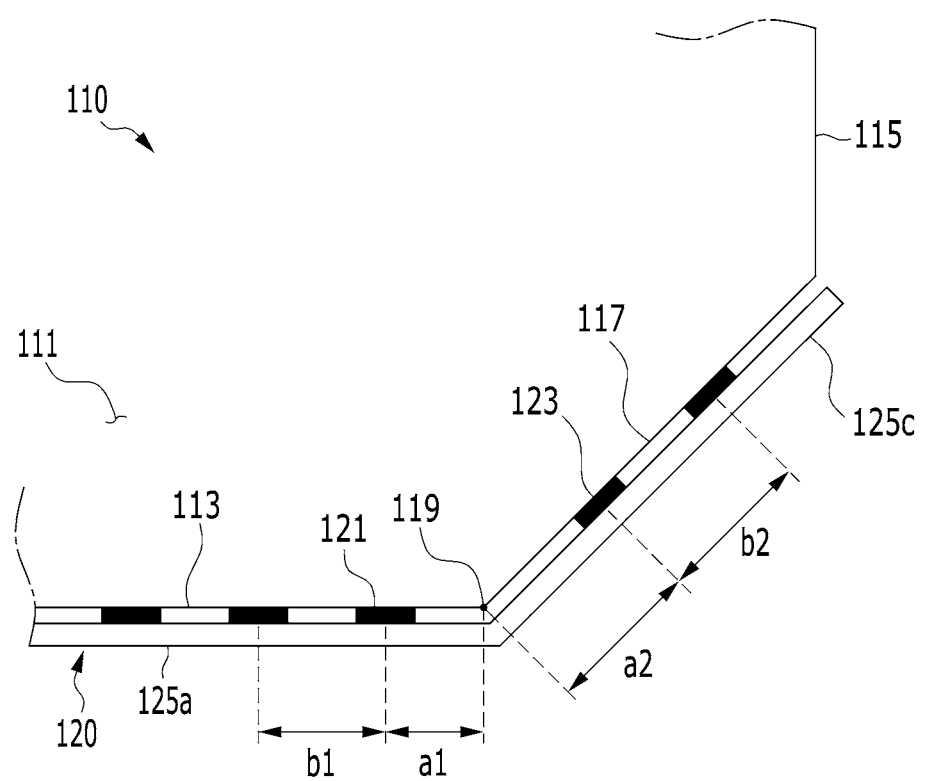
FIG. 17 is a top plan view illustrating a portion of a light emitting module according to an embodiment.

FIG. 16 is an enlarged view illustrating a portion of the light emitting module 100 corresponding to an area B of the display device 1000 illustrated in FIG. 15, and FIG. 17 is a top plan view illustrating the light emitting module 100 of FIG. 16.

Like the aforementioned light guide 110 illustrated in FIG. 3, FIG. 16 and FIG. 17 illustrate the light guide 110 including the face set 117 which connects the face 113 to the face 115.

Referring to FIG. 16 and FIG. 17, the distance a2 from the center of the light-emitting surface of an edge second light source 123 to the boundary 119 (which may coincide with an edge of the face set 117) is greater than the distance a1 from the center of the light-emitting surface of an edge first light source 121 to the boundary 119 (which may coincide an edge of the face 113), analogous to the embodiment of FIG. 3 and the first modification to the fourth modification of FIG. 3.

Accordingly, in the light guide 110 illustrated in FIG. 16, the distance a2 from the center of the light-emitting surface of the second light source 123 to the boundary 119 is greater than the distance a1 from the center of the light-emitting surface of the first light source 121 to the boundary 119. Accordingly, similar to the light guide 110 illustrated in FIG. 3, an overlapped amount of light emitted from the first light sources 121 and the second light sources 123 may be reduced. Thus, it is easy to adjust light luminance.

Further, as in the light guide 110 according to the embodiment of FIG. 3 and the light guide 110 according to the first modification to the fourth modification, the distance b2 between the second light sources 123 may be greater than the distance b1 between the first light sources 121. In an embodiment, the distance b1 between the first light sources 121 indicates a distance between (e.g., closest) two first light sources 121 disposed adjacent to each other. Similarly, the distance b2 between the second light sources 123 indicates a distance between (e.g., closest) two second light sources 123 disposed adjacent to each other.

Figure 18:
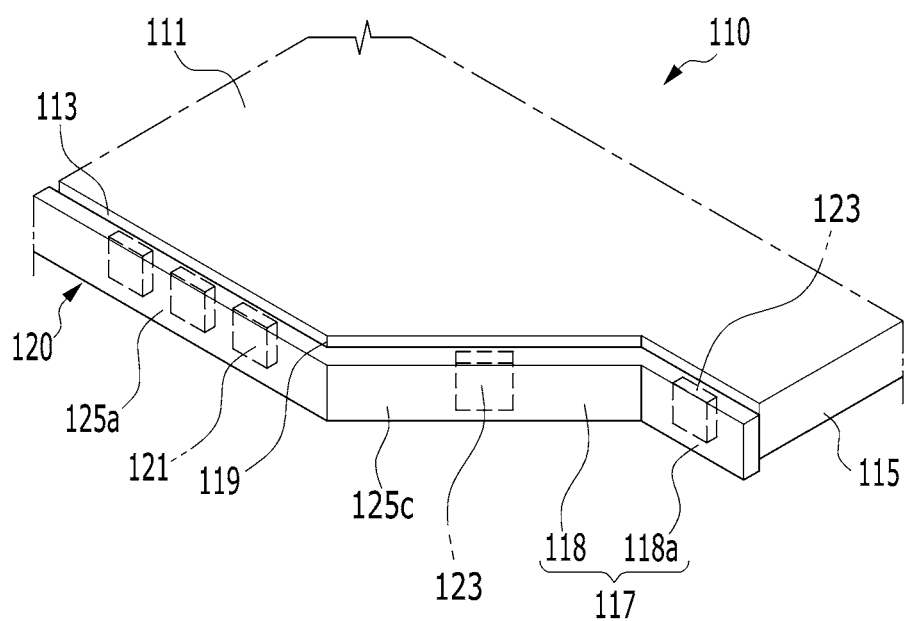
FIG. 18 is a perspective view illustrating a portion of a light emitting module according to an embodiment.
Figure 19:
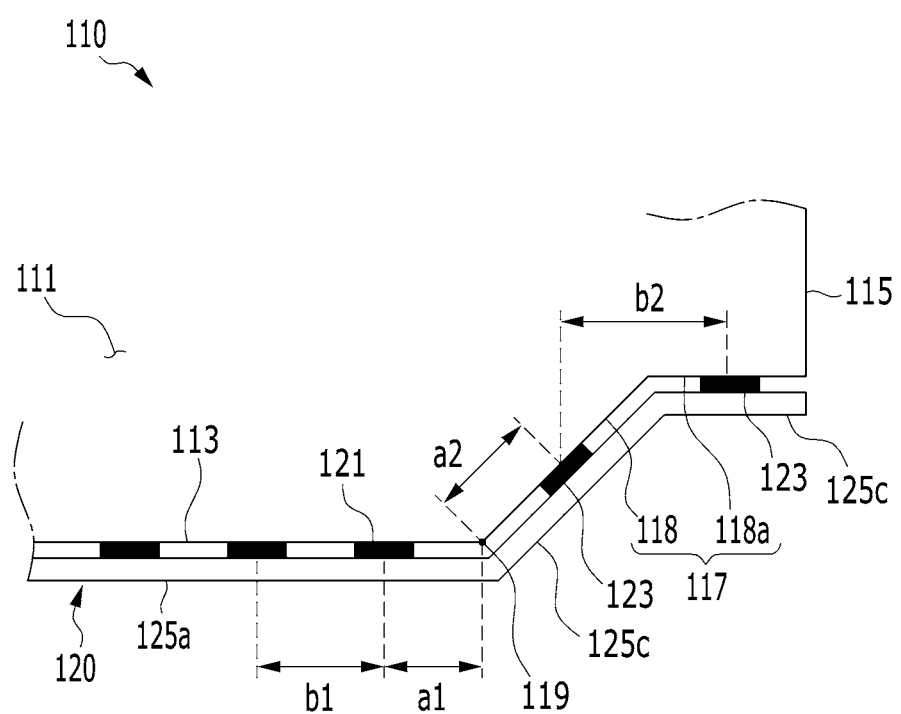
FIG. 19 is a top plan view illustrating a portion of a light emitting module according to an embodiment.

FIG. 18 is an enlarged view illustrating a corner portion of the light emitting module 100 including the light guide 110 according to a first modification of FIG. 16, and FIG. 19 is a top plan view illustrating the light emitting module 100 illustrated in FIG. 18.

The light guide 110 illustrated in FIG. 18 and FIG. 19 according to the first modification of FIG. 16 includes a face set 117 formed of a plurality of faces 118 and 118*a*, similar to the aforementioned light guide 110 illustrated in FIG. 7. In an embodiment, a face 118*a* may be oriented parallel to the face 113 and/or parallel to the first direction, and a face 118 may be oriented at an obtuse angle or a right angle with respect to the face 113.

Referring to FIG. 18 and FIG. 19, the distance a2 from the center of the light-emitting surface of an edge second light source 123 to the boundary 119 is greater than the distance a1 from the center of the light-emitting surface of an edge first light source 121 to the boundary 119. Therefore, similar to the aforementioned embodiment and the aforementioned modification, it is easier to adjust light luminance.

Further, similar to the aforementioned embodiment and the aforementioned modification, the distance b2 between the second light sources 123 may be greater than the distance b1 between the first light sources 121. In an embodiment, the distance b1 between the first light sources 121 indicates a distance between two first light sources 121 disposed adjacent/closest to each other. Similarly, the distance b2 between the second light sources 123 indicates a distance between two second light sources 123 disposed adjacent/closest to each other.

In an embodiment, the light guide 110 may include a pair of faces 113 disposed in parallel. For example, the pair of faces 113 may face each other.

In an embodiment, a width of a first one of the pair of faces 113 may be greater than that of a second one of the pair of faces 113 in a direction perpendicular to the light-emitting surface 111 of the light guide 110.

Figure 20:
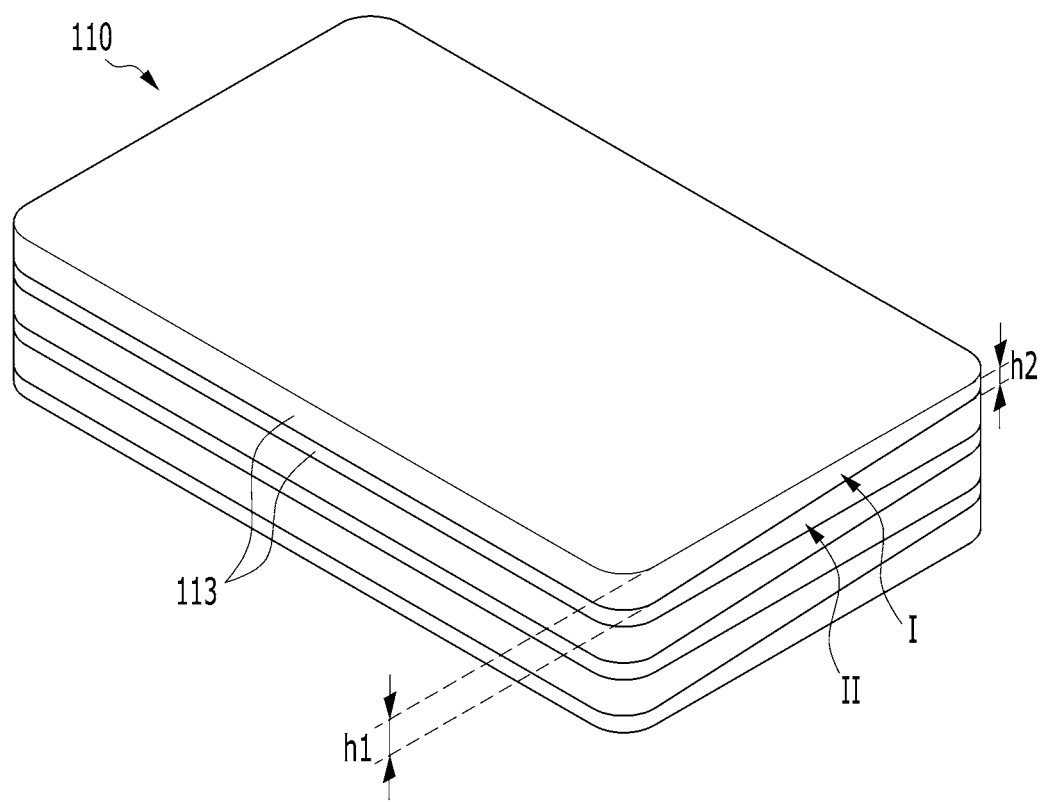
FIG. 20 illustrates that light guides, each of which includes a pair of opposite faces having different widths, are alternately stacked according to an embodiment.

FIG. 20 illustrates that light guides 110, including first light guides I and second light guides II, are alternately stacked. In an embodiment, in each of the first light guides I and the second light guides II, a width h1 of a first one of the pair of faces 113 is larger than a width h2 of a second one of the pair of faces 113. A light guide II may be equivalent to a reoriented/flipped light guide I. The face 113 having the larger width h1 in the first light guide I is stacked on (and may be coplanar with) the face 113 having the smaller width h2 in the second light guide II, and the ace 113 having the smaller width h2 in first light guide I is stacked on (and may be coplanar with) the face 113 having the larger width h1 in the second light guide II. According to an embodiment, in the light guides 110, the width h1 of one surface is larger than the width h2 of the other surface. If surfaces having the same widths are stacked on a same side, the stack may be inclined, such that manufacturing and/or storage of the light guides I and II may be difficult. Therefore, it is advantageous to form a stable stacked structure by alternately stacking aces of the light guides 110 (including light guides I and light guides II) having different thicknesses at a same side.

Figure 21:
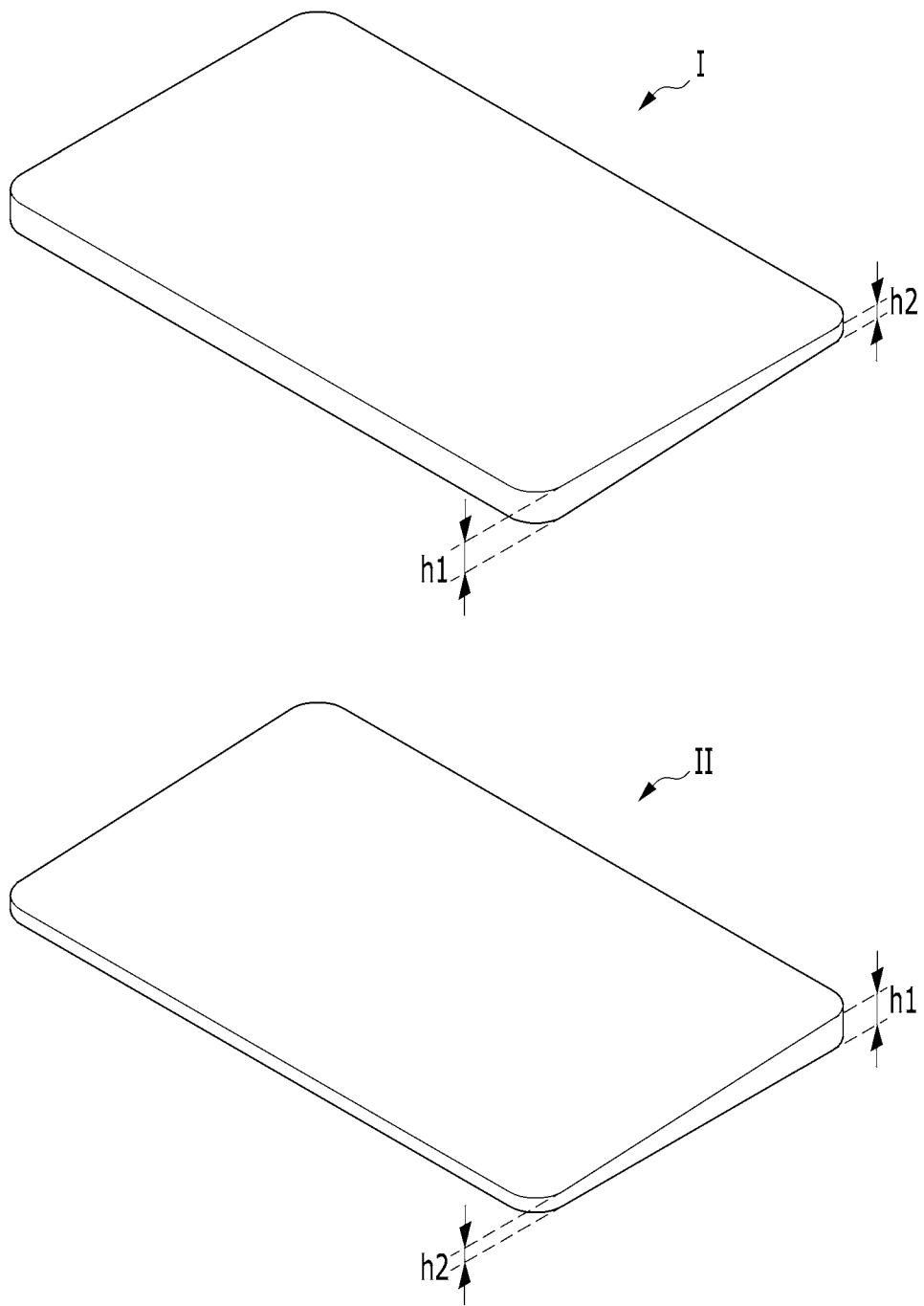
FIG. 21 illustrates a first light guide and a second light guide each of which has a pair of opposite faces with unequal widths.

Referring to FIG. 20, light guides I and light guides II are alternately stacked. Accordingly, referring to FIG. 20 and FIG. 21, it is possible to obtain a combined light guide stack that includes the first light guides I and the second light guides II and has a pair of opposite faces having substantially equal widths.

As described above, FIG. 1 is a top plan view illustrating the display device 1000 according to an embodiment, FIG. 2 is an exploded perspective view schematically illustrating the display device 1000 according to an embodiment, and FIG. 15 is an exploded perspective view illustrating constituent elements of the display device 1000 according to an embodiment.

The display device 1000 may include the display panel 200 and the light emitting module 100 Referring to FIG. 2 and FIG. 15.

The display panel 200 which serves to display a screen by using light supplied from the light emitting module 100 may have rounded corners for the application to the display device 1000 with the rounded corners Referring to FIG. 1.

The light emitting module 100 includes a light guide 110 and a light source unit 120. FIG. 2 and FIG. 15 illustrate modifications depending on a disposal relationship between light sources of the light source units 120 and the substrate 125. Specifically, FIG. 2 illustrates the side-view type of light source unit 120, and FIG. 15 illustrates the top-view type of light source unit 120.

The display device 1000 may include the light emitting module 100 corresponding to numerous modifications of the aforementioned light guides in addition to the modifications illustrated in FIG. 2 and FIG. 15. Descriptions related to these modifications are the same as described above, and thus a redundant description will be omitted.

In an embodiment, Referring to FIG. 2 and FIG. 15, the display device 1000 further includes a touch portion 300. The touch portion 300 may control the display device 1000 by sensing touches and/or receiving signals.

In an embodiment, the touch portion 300 includes an infrared sensor set 310 for determining a distance from a sensing target and/or a magnitude of an input signal by irradiating infrared rays to the sensing target and measuring a speed/time of return of the infrared rays. In an embodiment, the infrared sensor set 310 may include a plurality of infrared sensors 310.

Referring to FIG. 2 and FIG. 15, the touch portion 300 is also for application to the display device 1000 with the rounded corners. To that end, the touch portion 300 includes a first area 320 which corresponds to the face 113 of the light guide 110, a second area 330 which corresponds the face set 117 of the light guide 110, and a boundary area 340 which corresponds to the boundary 119 of the light guide 110 as a boundary between the first area 320 and the second area 330 and may coincide with an edge of the area 320 and/or an edge of the area 330.

Figure 22:
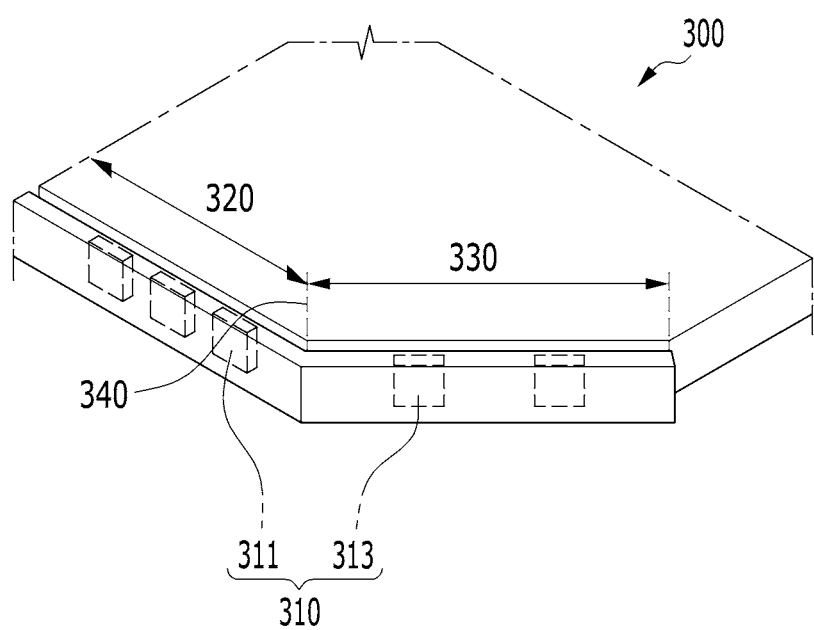
FIG. 22 is a perspective view illustrating a corner of a touch portion according to an embodiment.
Figure 23:
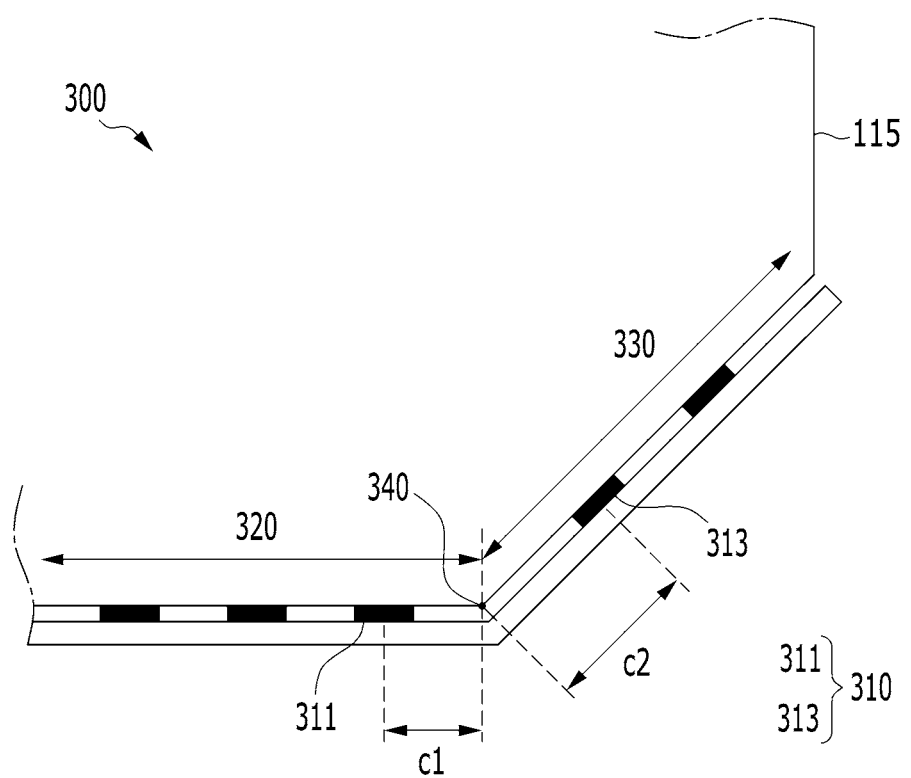
FIG. 23 is a top plan view illustrating a corner of a touch portion according to an embodiment.

FIG. 22 is an enlarged view schematically illustrating a corner of the touch portion 300 according to an embodiment, which corresponds an area B of FIG. 2 and FIG. 15, and FIG. 23 is a top plan view illustrating the touch portion 300 illustrated in FIG. 22.

Referring to FIG. 22 and FIG. 23, one of the infrared sensors 310 which is disposed in/or (and disposed closed to the edge of) the first area 320 is defined as a first infrared sensor 311, and one of the infrared sensors 310 which is disposed in/or (and disposed closed to the edge of) the second area 330 is defined as a second infrared sensor 313.

In an embodiment, a distance c2 from a center of an infrared light-emitting surface of the second infrared sensor 313 to the boundary area 340 is greater than a distance c1 from a center of an infrared light-emitting surface of the first infrared sensor 311 to the boundary area 340. This reason is the same as the aforementioned reason related to the disposal relationship between the first light sources 121 of the light emitting module 100 and the second light sources 123.

In other words, when the distance c2 from the boundary area 340 to the second infrared sensor 313 is greater than the distance c1 from the boundary area 340 to the first infrared sensor 311, an overlapped area of infrared rays irradiated from the infrared sensor 310 may be reduced. Thus, sensing efficiency and/or energy efficiency may be optimized.

In an embodiment, the first infrared sensor 311 may include a plurality of first infrared sensors 311 and the second infrared sensor 313 may include a plurality of second infrared sensors 313. In the case of the first infrared sensors 311 and the second infrared sensors 313, the distance c2 between a center of an infrared light-emitting surface of one of the second infrared sensors 313 which is nearest to the boundary area 340 and the boundary area 340 is compared with the distance c1 between a center of an infrared light-emitting surface of one of the first infrared sensors 311 which is nearest to the boundary area 340 and the boundary area 340.

Similar to the aforementioned light emitting module 100, the distance c2 between a center of an infrared light-emitting surface of one of the second infrared sensors 313 which is nearest to the boundary area 340 and the boundary area 340 is greater than the distance c1 between a center of an infrared light-emitting surface of one of the first infrared sensors 311 which is nearest to the boundary area 340 and the boundary area 340.

In the case of one second infrared sensor 313 and the plurality of first infrared sensors 311, the distance c1 between a center of an infrared light-emitting surface of one of the first infrared sensors 311 which is nearest to the boundary area 340 and the boundary area 340 may be compared with a distance c2 between a center of an infrared light-emitting surface of the second infrared sensor 313 and the boundary area 340.

In embodiments, modifications of the first light sources 121 and the second light sources 123 of the light emitting module 100 described above may be similarly applied to the first infrared sensors 311 and the second infrared sensors 313.

In an embodiment, the display device 1000 may further include a window 400 disposed to protect against external impact and contamination on the display panel 200 and the touch portion 300. The window 400 may be formed of generally-used transparent glass or resin, and may be formed to have rounded corners to be applied to the display device 1000 having the rounded corners according to an embodiment.

According to embodiments, a light emitting module and/or a display device may have substantially uniform light luminance distribution.

Although embodiments have been described and illustrated, practical embodiments are not limited to the described embodiments. Various changes and modifications might be made to these embodiments without departing from the spirit and the scope defined by the appended claims.

What is claimed is:

1. A light emitting module comprising:
a light guide, which includes a light-emitting surface, an opposite surface, a first face, a second face, and a third face, wherein the opposite surface is opposite the light-emitting surface, wherein each of the first face, the second face, and the third face is connected between the light-emitting surface and the opposite surface and is smaller than each of the light-emitting surface and the opposite surface, wherein the first face is not coplanar with the third face, and wherein the second face is oriented not parallel to the first face and is connected through the third face to the first face;
a first light source set, which is disposed at the first face and includes a first first-set light source, wherein the first first-set light source directly contacts the first face, and wherein no light source is positioned between the first first-set light source and an edge of the first face;
a second light source set, which is disposed at the third face and includes a first second-set light source, wherein the first second-set light source directly contacts the third face, wherein no light source is positioned between the first second-set light source and an edge of the third face, and wherein a distance from a center of a light-emitting face of the first second-set light source to the edge of the third face is greater than a distance from a center of a light-emitting face of the first first-set light source to the edge of the first face.

2. The light emitting module of claim 1, wherein a tangent to the third face is oriented at an obtuse angle or a right angle with respect to the first face.

3. The light emitting module of claim 1, wherein the first light source set includes a second first-set light source, wherein no light source is positioned between the first first-set light source and the second first-set light source, wherein the second light source set includes a second second-set light source, wherein no light source is positioned between the first second-set light source and the second second-set light source, wherein a distance between the first second-set light source and the second second-set light source is greater than a distance between the first first-set light source and the second first-set light source.

4. The light emitting module of claim 1, wherein the light guide includes a fourth face, wherein each of the second face and the third face is connected through the fourth face to the first face.

5. The light emitting module of claim 4, wherein the third face is oriented parallel to the first face.

6. The light emitting module of claim 4 comprising: a third light source set, which faces the fourth face and includes a first third-set light source.

7. The light emitting module of claim 6, wherein the first light source set includes a second first-set light source, wherein no light source is positioned between the first first-set light source and the second first-set light source, and wherein a distance between the first third-set light source and the first second-set light source in a direction parallel to the first face is greater than a distance between the first first-set light source and the second first-set light source in the direction parallel to the first face.

8. The light emitting module of claim 4, wherein the fourth face is oriented at an obtuse angle with respect to at least one of the first face and the third face.

9. The light emitting module of claim 4, wherein the fourth face is oriented parallel to the second face.

10. The light emitting module of claim 1, wherein the third face is a curved face.

11. The light emitting module of claim 1, wherein the substrate includes:
a first substrate face parallel to the first face;
a second substrate face parallel to the second face; and
a third substrate face configured to connect the first substrate face with the second substrate face and parallel to the third face.

12. The light emitting module of claim 11, wherein the third substrate surface is planar or curved.

13. The light emitting module of claim 1, wherein the light-emitting surface of the first light source set and the light-emitting surface of the second light source set are perpendicular to a mounting surface of the substrate in which the first light source set and the second light source set are mounted.

14. The light emitting module of claim 1, wherein the light-emitting surface of the first light source set and the light-emitting surface of the second light source set are parallel to a mounting surface of the substrate in which the first light source set and the second light source set are mounted.

15. The light emitting module of claim 1, wherein the light guide includes a fourth face, which faces the first face, is oriented parallel to the first face.

16. The light emitting module of claim 15, wherein the fourth face is shorter than the first face in a direction perpendicular to the light-emitting surface.

17. The light emitting module of claim 16, wherein the first face and the fourth face are symmetrical to each other.

18. A display device comprising:
a display panel;
a light guide, which overlaps the display panel and includes a first face, a second face oriented not parallel to the first face, a third face shorter than the first face and connected between the first face and the second face, and a light-emitting surface larger than each of the first face, the second face, and the third face;
a first light source set disposed at the first face; and
a second light source disposed at the third face,
wherein a distance between two closest light sources of the second light source set is greater than a distance between two closest light sources of the first light source set.

19. The display device of claim 18, further comprising
a touch portion, which includes a first area corresponding to the first surface and includes a second area corresponding to the third surface;
a first infrared sensor set, which is disposed at the first area and includes a first first-set infrared sensor, wherein no infrared sensor is positioned between the first first-set infrared sensor and an edge of the first area; and
a second infrared sensor set, which is disposed at the second area and includes a first second-set infrared sensor, wherein no infrared sensor is positioned between the first second-set infrared sensor and an edge of the second area,
wherein a distance from a center of an infrared light-emitting surface of the first second-set infrared sensor to the edge of the second area is greater than a distance from a center of an infrared light-emitting surface of the first first-set infrared sensor to the edge of the first area.

20. The display device of claim 19, wherein a distance between two closet infrared sensors of the second infrared sensor set is greater than a distance between two closest infrared sensors of the first infrared sensor set.

* * * * *